United States Patent [19]

Freeman

[11] Patent Number: 4,774,565
[45] Date of Patent: Sep. 27, 1988

[54] METHOD AND APPARATUS FOR RECONSTRUCTING MISSING COLOR SAMPLES

[75] Inventor: William T. Freeman, Brookline, Mass.

[73] Assignee: Polaroid Corporation, Cambridge, Mass.

[21] Appl. No.: 88,801

[22] Filed: Aug. 24, 1987

[51] Int. Cl.$^4$ .............................................. H04N 9/04
[52] U.S. Cl. ......................................... 358/41; 358/36
[58] Field of Search ....................... 358/41, 43, 44, 36; 382/54

[56] References Cited

U.S. PATENT DOCUMENTS

| | | | |
|---|---|---|---|
| 4,562,470 | 12/1985 | Dinh et al. | 358/36 X |
| 4,605,956 | 8/1986 | Cole | 358/44 |
| 4,613,986 | 9/1986 | Ataman et al. | 382/54 |
| 4,630,307 | 12/1986 | Cole | 382/54 X |
| 4,663,655 | 5/1987 | Freeman | 358/41 |
| 4,682,230 | 7/1987 | Perlman et al. | 358/36 X |

OTHER PUBLICATIONS

"An Image Processing System for Enhancement and Deblurring of Photographs", by Dr. A. F. Lehar, Dr. F. H. Preston and Dr. T. M. Cannon, International Conference on Electronic Image Processing, Institute of Electrical Engineers, Conference Publication No. 214, Jul. 1982, pp. 174–178.

"One-Dimensional Processing for Adaptive Image Restoration", by P. Chan & J. Lim, ICASSP 84 Proceedings, IEEE International Conference on Acoustics, Speech and Signal Processing, San Diego, Mar. 1984, Paper 37.3.

"A Separable Median Filter for Image Noise Smoothing", by P. Narendra, IEEE Transactions on Pattern Analysis and Machine Intelligence, vol. PAMI-3, No. 1, Jan. 1981, pp. 20–29.

Primary Examiner—James J. Groody
Assistant Examiner—E. Anne Faris
Attorney, Agent, or Firm—Edward S. Roman

[57] ABSTRACT

An improved method and apparatus is provided for sensing scene light and providing sampled image data in three colors in response thereto. The sampled image data is subsequently interpolated for the non-sampled colors and thereafter subtracted to provide two color difference signals. The two color difference signals, in turn, are each median filtered and subsequently reconstructed in conjunction with the originally sampled image data to provide an image of the subject with substantially reduced color fringing. The median filter preferably filters color difference signals corresponding to a select number of image sensing elements separated with respect to each other by non-select image sensing elements.

21 Claims, 3 Drawing Sheets

METHOD AND APPARATUS FOR RECONSTRUCTING MISSING COLOR SAMPLES

FIELD OF THE INVENTION

This invention relates generally to an improved apparatus and method for sensing and interpolating image data and, more particularly, to an improved apparatus and method for sensing sampled image data and thereafter interpolating for the nonsampled image data in a manner that substantially reduces color fringing. It will be convenient to describe the invention more particularly with respect to apparatus that detects and reproduces an image by means of three colors, the most widely used format for color imaging.

BACKGROUND OF THE INVENTION

Electronic imaging cameras for recording still images are well known in the art. Such cameras can record a plurality of still images on a single magnetic disk or tape in either analog or digital format for subsequent playback on any well-known cathode ray tube viewing device. Printers may also be utilized with such cameras in a well-known manner to provide hard copy of the recorded images. Such electronic imaging still cameras may utilize two-dimensional image sensing arrays such as charge coupled devices (CCD's) which integrate incident scene light over a predetermined time to provide an electronic information signal corresponding to the scene light intensity incident on the array. Such two-dimensional image sensing arrays comprise a predetermined number of discrete image sensing elements or pixels arranged in a two-dimensional array in which each image sensing element responds to incident illumination to provide an electronic information signal corresponding to the intensity of the incident illumination.

In order to record color images, the illumination incident on the two-dimensional image sensing array is filtered so that different image sensing elements receive different colored illumination. The filters are arranged in well-known patterns across the face of the image sensing array, such as a repeating pattern of red, green and blue stripes. Alternatively, individual image sensing elements or pixels across each line may be filtered in a repeating pattern of red, green, blue, green filters, as is well known in the art. Since each image sensing element can only detect one color of illumination, the color information for the other colors not detected by that image sensing element must be filled in. Filling in the missing color information is generally accomplished by interpolating the detected image data for each color to determine color values for all the colors for each image sensing element. In particular, there results three groups of image sensing elements of which respective ones have measured values for one given color and an interpolated value for the other two colors.

Conventional types of interpolation, however, can provide images with objectionable aliasing artifacts such as "color fringes" near sharp edges. The conventional approach to solve this problem is to eliminate the color fringes at the expense of image sharpness by either blurring the picture or removing selected spacial frequencies from the picture (antialiasing) so that edges do not create color fringes. Blurring the image in this manner, however, has its obvious disadvantages resulting in a reduction in resolution and a so-called "fuzzy" picture.

In my earlier U.S. Pat. No. 4,663,655, which issued on May 5, 1987, there is described a novel technique for providing the desired interpolated values. In this technique, there is first inserted for the missing values approximate values derived by simple linear interpolation in the usual fashion, and thereafter, the resulting values are used to derive a number of difference values for each of the pixels by subtracting the resulting values at different pairs of colors. These difference values are then passed through a simple linear median filter to reduce the color fringe artifacts described above, and then the various filtered differences are combined to reconstruct three color values at each pixel for use in the image scene reproduction.

While this technique provides a considerable improvement, each color image signal processed requires a separate median filter of a relatively complex nature.

Accordingly, it is desirable to eliminate color fringing artifacts in the aforementioned manner using fewer median filters of a less complex nature.

SUMMARY OF THE INVENTION

The present invention represents an improvement of the apparatus of my earlier invention primarily in the use of fewer median filters of a less complex nature.

First, in the reproduction of a three-color image scene, there are used only two rather than three difference signals that require median filtering for removing the color fringe artifacts. The image may be satisfactorily reconstructed, despite the elimination of one of the median filters previously used. This aspect of the invention is independent of the median filter used and thus may be embodied in apparatus using any median filter that replaces a sample with the median of neighboring samples.

Second, the efficacy of the median filter used in the apparatus of this invention is, substantially, as dependent on the spatial extent of the pixels used as it is on the number of pixels used, so that a linear median filter which is seven pixels wide but uses only three terms, the two end pixels and the center pixel whose value is to be replaced with the median value of the three pixels when combined with low pass filtering, is substantially as effective as an eleven-pixel wide eleven-term median filter.

Moreover, for two-dimensional filtering in accordance with my invention, there is employed an area median or two dimensional filter which uses only nine pixels chosen from an area seven pixels wide and five pixels high. This filter when combined with two-dimensional low pass filtering compares favorably with one that uses the entire array of thirty five pixels of the area. These improvements are similarly independent of the number of median filters used.

In particular, an illustrative embodiment of the present invention includes a conventional solid-state image sensing camera, including a CCD, in which a different one-third of the total number of pixels, or discrete sensing elements, views the image scene in respective ones of three different wavelength ranges, or colors, and are provided with a measured signal value at each such pixel. There is next provided for each pixel an interpolated signal value for each of its two unmeasured colors, equal to that of the measured range of wavelengths. Thereafter, there are derived for each pixel a first difference signal value that is a measure of the difference in intensity of its signal for one pair of colors and a second difference signal that is a measure of the difference in intensity of its signal value for a different pair of colors. Thereafter, each of these two difference signal values is passed through a novel form of median filter. For one-dimensional filtering, the filter is preferably seven elements wide but uses only the first, fourth and seventh elements to find the value to be substituted for the value of the fourth element. For two-dimensional filtering, the filter is preferably seven elements wide and five elements high but uses only nine of the elements to find the value to be substituted for the center element.

Finally, from these two filtered difference signal values and the original measured signal values, there are reconstructed for each pixel three signal values, one for each of the three different colors. The reconstructed signal values are then used to reproduce the original image scene.

DETAILED DESCRIPTION OF THE DRAWINGS

The invention will be better understood from the following more detailed description taken in conjunction with the accompanying drawings.

DETAILED DESCRIPTION OF THE INVENTION

Figure 1:
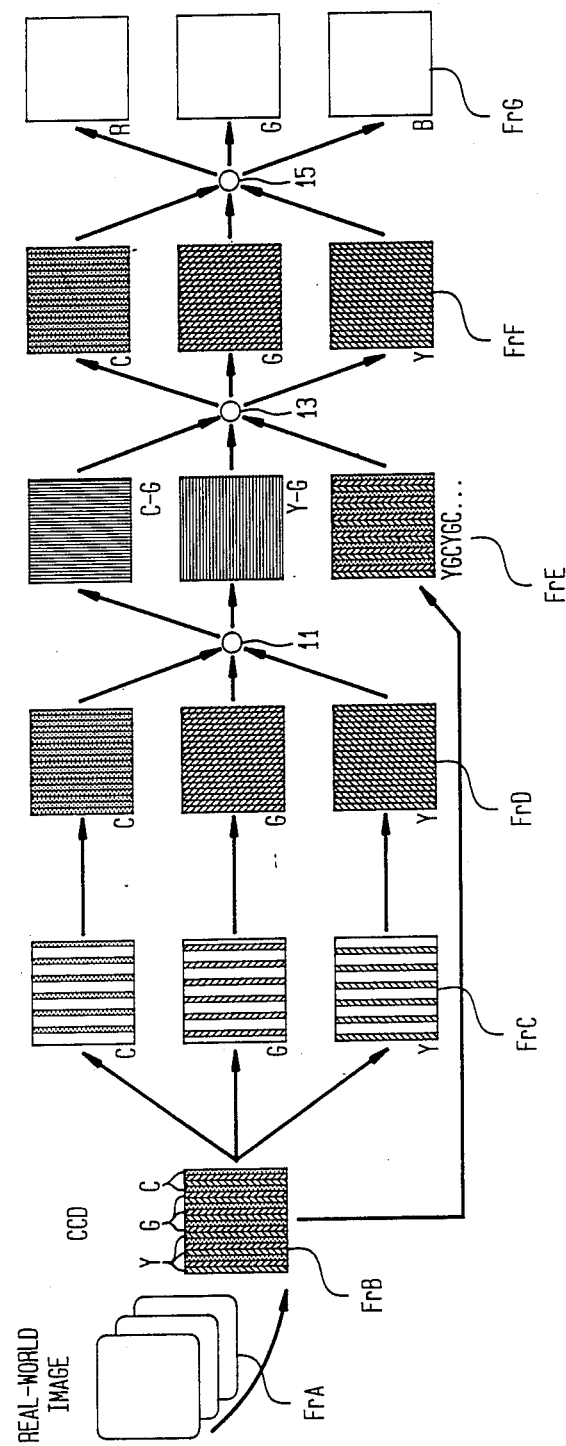
FIG. 1 is a pictorial flow chart illustrating the main steps of the basic interpolation process of the invention.

Referring now to FIG. 1, there is shown in pictorial form a flow diagram of the process of interpolation in accordance with the present invention.

In frame FrA, there is depicted a colored scene which can be viewed as made up of the superposition of three images, each limited to one of three ranges of wavelengths, for example, yellow, green and cyan. Typically, the colored scene light is passed through a repeating array of three separate vertical filters. The filtered scene light is then scanned by an electronic imaging sensor, for example, a charge-coupled device (CCD) of the frame or line transfer type. As will be readily understood, the colored filters may be integrally formed on the CCD. In the usual fashion, each pixel of the imaging sensor receives only one of the three colors, and in each triplet of three horizontally contiguous pixels, each pixel receives a different color. This is depicted in frame FrB, which shows the scene viewed by successive pixels of a CCD sensor, each in only one of the three colors. In frame FrC, there is shown the image scene as divided into, three separate scenes, one in each channel of a color C, G and Y, with intensity values provided at only every third pixel for each scene, or one pixel of each triplet. An intensity value at the other two pixels of a triplet for such color is obtained by a first interpolation. Since this first interpolation is not critical, a simple interpolation is possible. For example, it is adequate merely to use the value measured for a given color at one pixel of a triplet for a value of that color for the two other pixels of the triplet. As a result, the three yellow values for the three pixels of a triplet are the same, the three green values are the same, and the three cyan values are the same. This is represented in Frame FrD.

The signals in each color channel are then amplified, the relative gains of the three channels being such that a neutral grey light input elicits the same response from all three channels.

There are then performed color signal subtractions by a subtractor 11 to derive color signal difference values, Y-G and C-G. The amplitude of the signal in the G channel is subtracted from that of the Y channel and the C channel, respectively. The result of this subtraction is represented schematically in the top two channels of frame FrE. The third and bottom channel remains the same as frame FrB.

In the foregoing respects, the process of the present invention resembles that described in my aforementioned patent for three color imaging, except it will be readily understood that only two color subtractions are made for a three color system in comparison with the three color subtractions required by my aforementioned patent.

In the apparatus of my prior patent, the resulting three outputs of the subtractors were then each subjected to a one-dimensional horizontal linear median filter which was five elements or samples wide and which used all five samples. As is discussed in the patent, this step is important to reduce color fringing artifacts that otherwise are present.

However, in practice it was found that while this horizontal linear filter using five samples made for a discernible reduction in artifacts, it also required fairly complex circuitry to implement. It has been found in accordance with the method and apparatus of this invention that at least as good a result can be obtained with considerable simplification in circuitry if there is used for one-dimensional median filtering simply a three term median filter in which the three terms comprise the sample involved plus the two samples three pixels away from it on either side in the same horizontal line. Moreover, still further improvement can be obtained if there is employed a two-dimensional area median filter which uses the median of nine samples spaced apart over an area encompassing thirty five possible samples.

The two filtered-difference sets of signal values are combined at 13 with the original set of signal values as depicted by Fram FrF to reconstitute three color signal values for each pixel. These values are then combined at 15 to produce the original image with the three additive primary colors, red, green and blue in the usual fashion, as depicted by the frame FrG.

Figure 2:
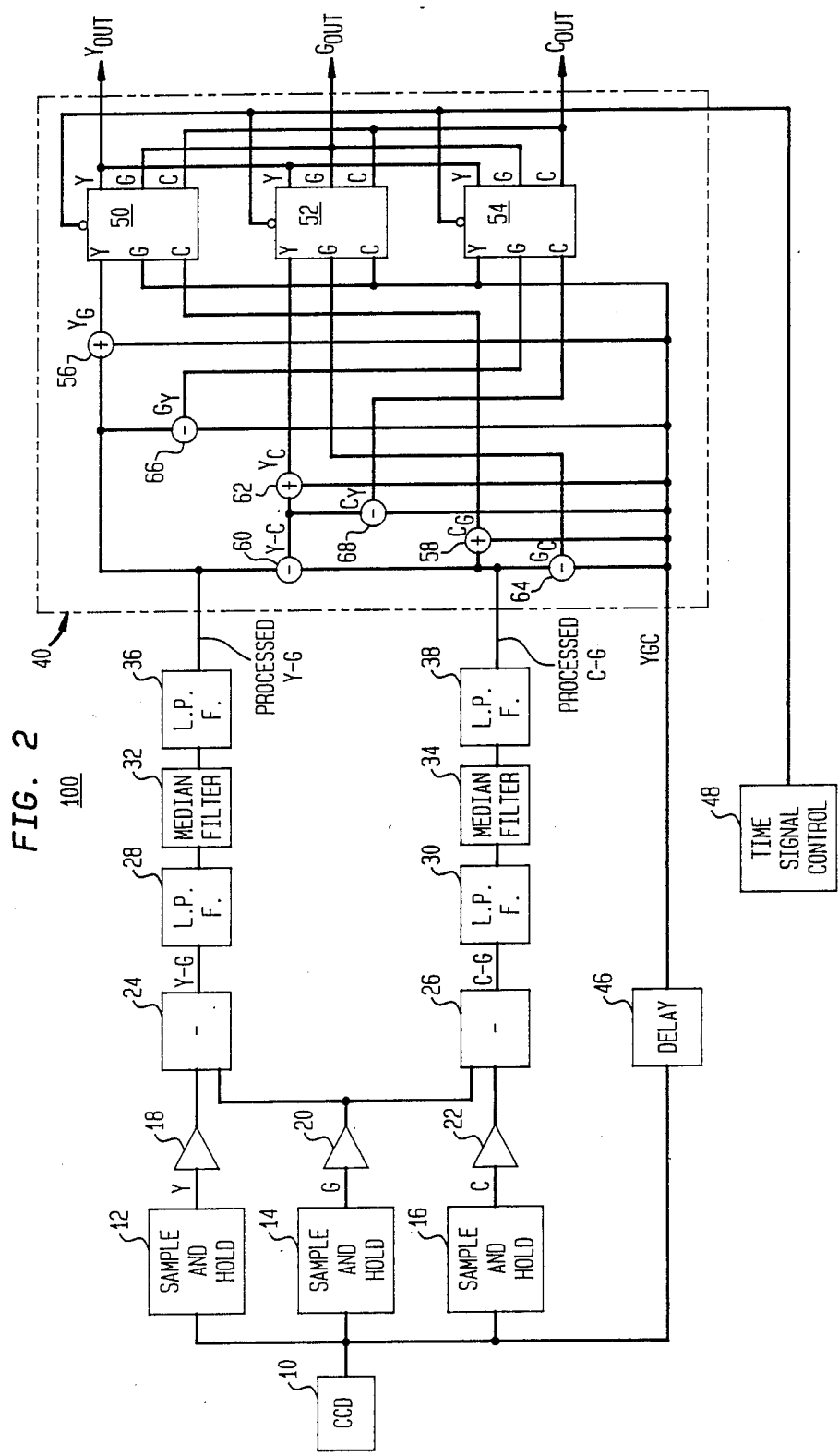
FIG. 2 is a schematic block diagram of an illustrative embodiment of the invention.

Referring now to FIG. 2, there is shown in block schematic form apparatus 100 in accordance with the present invention. First, there is derived from an image sensor 10, typically a CCD, a signal in serial form in which successive samples represent the values of charge collected at successive pixels of the sensor, where each pixel is excited by only one of the three color components since the illumination on each pixel first passes through a vertical line filter (not shown) that transmits only one of such colors as previously discussed. Preferably, there is an array of such filters in repeating sets of three, transmitting cyan, green and yellow components, respectively. These are preferably arranged so that sets or triplets of three successive pixels will experience respective ones of the three filters, as is conventional in color imaging systems. This measured signal value on each pixel is then supplied to respective ones of three separate sample and hold circuits 12, 14 and 16, each of which is designed to store the measured value at a different one of each pixel of a triplet. These correspond, respectively, to channels for the yellow-excited pixels, the green-excited pixels, and the cyan-excited pixels. Each sample and hold circuit holds such sample for the scanning time interval of the next two succeeding pixels to permit processing with such sample until it receives a new sample from a pixel excited in its characteristic color. Circuits for accomplishing this sample and hold function as well known in the art.

By holding each sample for the next two succeeding pixel intervals, there is essentially replicated the signal value for the one pixel which provided the original measured signal value as well as the two succeeding pixels which were initially free of signal values for that color. This serves the function of the linear interpolation described in the aforementioned patent. Alternatively, linear interpolation as described in my prior patent may be substituted for such replication interpolation.

The outputs of each of these sample and hold circuits 12, 14 and 16 are passed, respectively, to amplifiers 18, 20 and 22 where each is amplified. The gain of the different amplifiers is adjusted, as previously discussed, so that a neutral color, e.g., white, after conversion by the camera to three signal samples of different colors will produce signals of equal amplitude at each of the three amplifier outputs. Typically, this may involve a greater gain for the amplifier of the green channel than the others because of the greater losses in green to filtering.

Thereafter, the outputs of amplifiers 18 and 20 are supplied to a subtractor network 24 for deriving the difference signal value Y-G, and the outputs of amplifiers 20 and 22 are supplied to subtractor network 26 for deriving the difference signal value C-G, where C, G and Y are the signal values in the C, G and Y channels, respectively. The subtractive networks may simply be differential amplifiers with inverting and non-inverting inputs.

The difference signals available at the outputs of subtractors 24 and 26 are preferably passed through low pass filters 28 and 30, respectively, for some blurring of the signals.

The two separate difference signals are then supplied to the median filters 32 and 34, respectively, which in accordance with the present embodiment are preferably one-dimensional median filters seven samples wide that use only three samples. In such a filter, there is examined the signal values for the first, fourth and seventh pixels of a line of seven pixels and the median of the three values is chosen as the value for the fourth pixel of the line.

Figures 3, 4:
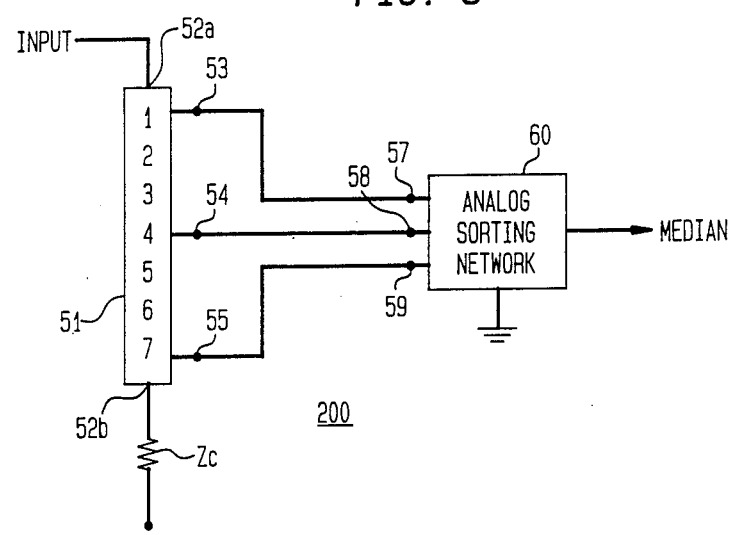
FIG. 3 shows in schematic block form a one-dimensional median filter for use in the embodiment of FIG. 2.
FIG. 4 shows the masking pattern of a two-dimensional filter for use in the embodiment of FIG. 1.

Referring now to FIG. 3, there is shown a circuit 200 in accordance with the present invention which acts as a one-dimensional median filter. It comprises a delay line 51, one end 52a of which is supplied with the signal to be filtered, and the other end 52b of which is terminated in its characteristic impedance $Z_C$ to be reflectionless. Numerals 1-7 are included to indicate schematically seven signals along delay line 51. Taps 53, 54 and 55 indicate the tapping of the signals from the first, fourth and seventh pixels. The signals available at each of these taps at a given time are supplied to the three inputs 57, 58 and 59, respectively, of an analog sorting network 60, designed to provide at its output at a predetermined time, the value of the signal that is the median of the three values of signals applied to its three inputs. Various circuits may be readily designed for this function. An example of such a circuit is described at pages 72-74 of *Electronic Design* 2, Jan. 18, 1973 in an article entitled, "Analog Sorting Network Ranks Inputs by Amplitude and Allows Selection."

Referring again to FIG. 2, after such median filtering, the two filtered signals are preferably supplied, respectively, to low pass filters 36 and 38. The outputs of the low pass filters 36 and 38 are designated as processed signals.

These processed signals, Y-G and C-G, in turn, are supplied to a reconstructing network 40 which uses the two processed signals and the original signal provided by the CCD 10, appropriately delayed by a delay element 46, to derive for each pixel a signal value at each of the three colors. The network 40 comprises a plurality of discrete adders and subtractors to which appropriate combinations of the two processed difference signals and the original signals are applied to derive the desired color signal value. In particular, there is derived from the reconstructing network 40 three separate color outputs, as shown at output terminals Y, G and C.

The network 40 comprises three gate circuits shown generally at 50, 52 and 54. Each of the gate circuits 50, 52 and 54 is selectively enabled at different times by a timing signal control 48 to gate three respective yellow, green and cyan image information signals between the correspondingly designated terminals. The timing control signal from circuit 48 controls the gate circuits 50, 52 and 54 so as to enable: gate circuit 50 when color information signals are output from the delay 46 for pixels filtered to receive green image scene light; gate circuit 52 when color information signals are output from the delay 46 for pixels filtered to receive cyan image scene light; and, gate circuit 54 when color information signals are output from the delay 46 for pixels filtered to receive yellow image scene light.

Thus, each green pixel image value from the CCD 10 is appropriately delayed by the delay 46 and subsequently transmitted by the gate 50 which is enabled in the aforementioned manner by the time signal control 48 to provide a green image information signal at output terminal $G_{out}$. At the same time, the processed Y-G signal is added by an adder 56 to the green (G) pixel image signal received from the CCD 10 by way of the delay 46 to provide a yellow ($Y_G$) signal value that is subsequently transmitted through the enabled gate circuit 50 to provide a yellow image information signal at the output terminal $Y_{out}$ simultaneously with the aforementioned green information signal provided at output terminal $G_{out}$. Also at the same time, the processed C-G signal is added by an adder 58 to the same green (G) pixel image signal received from the CCD 10 by way of the delay 46 to provide a cyan ($C_G$) signal value that is subsequently transmitted through the enabled gate circuit 50 to provide a cyan image information signal at the output terminal $C_{out}$ simultaneously with the aforementioned yellow and green information signals provided at output terminals $Y_{out}$ and $G_{out}$, respectively. Thus, in this manner after the delay 46 transmits green color sample values, the reconstructing network 40 provides green image information signals corresponding to the green color sample values sensed by the CCD 10 and yellow and cyan image information signals interpolated in the aforementioned manner of this invention for the same pixels.

In like manner each cyan pixel image value from the CCD 10 is appropriately delayed by the delay 46 and subsequently transmitted by the gate 52 which is enabled in the aforementioned manner by the time signal control 48 to provide a cyan image information signal at output terminal $C_{out}$. At the same time, the processed C-G signal is subtracted by a subtractor 60 from the processed Y-G signal to provide a Y-C signal. An adder 62 subsequently adds the cyan (C) pixel image signal received from the CCD 10 by way of the delay 46 to the processed Y-C signal to provide a yellow ($Y_C$) signal value that is subsequently transmitted through the enabled gate circuit 52 to provide a yellow image information signal at the output terminal $Y_{out}$ simultaneously with the aforementioned cyan information signal at output terminal $C_{out}$. Also at the same time, the same cyan (C) pixel image signal received from the CCD 10 by way of the delay 46 is subtracted by a subtractor 64 from the processed C-G signal to provide a green ($G_C$) signal value that is subsequently transmitted through the enabled gate circuit 52 to provide a green image information signal at the output terminal $G_{out}$ simultaneously with the aforementioned cyan and yellow information signals provided at output terminals $C_{out}$ and $Y_{out}$, respectively. Thus, in this manner after the delay 46 transmits cyan color sample values, the reconstructing network 40 provides cyan image information signals corresponding to the cyan color sample values sensed by the CCD 10 and yellow and green image information signals interpolated in the aforementioned manner of this invention for the same pixels.

Each yellow pixel image value from the CCD 10 is also appropriately delayed by the delay line 46 and subsequently transmitted by the gate 54 which is enabled in the aforementioned manner by the time signal control 48 to provide a yellow image information signal at output terminal $Y_{out}$. At the same time, a subtractor 66 operates to subtract the yellow (Y) pixel image signal received from the CCD 10 by way of the delay 46 from the processed Y-G signal to provide a green ($G_Y$) signal value that is subsequently transmitted through the enabled gate 54 to provide a green image information signal at the output terminal $G_{out}$ simultaneously with the aforementioned yellow information signal at output terminal $Y_{out}$. Also at the same time, a subtractor 68 operates to subtract the same yellow (Y) pixel image signal received from the CCD 10 by way of the delay 46 from the signal Y-C output from the subtractor 60 to provide a cyan ($C_Y$) signal value that is subsequently transmitted through the enabled gate circuit 54 to provide a cyan image information signal at the output terminal $C_{out}$ simultaneously with the aforementioned yellow and green information signals provided at output terminals $Y_{out}$ and $G_{out}$, respectively. Thus, in this manner after the delay 46 transmits yellow color sample values, the reconstructing network provides yellow image information signals corresponding to the yellow color sample values sensed by the CCD 10 and green and cyan image information signals interpolated in the aforementioned manner of this invention for the same pixels.

In this manner for each pixel of the CCD 10 in which one of three different color values is sensed, there are provided interpolated values for the other two colors using only two median filters representing a substantial simplification in comparison with the median filter interpolation arrangement of my aforementioned patent in which three median filters were required for a three color system.

It should be appreciated that modifications in the processing algorithm used can be made without departing from the spirit of the invention. In particular, the complement of either or both difference signals described can be used instead, as well as other colored filters such as primary red, green and blue colored filters.

In some instances, the one-dimensional median filter will not completely remove the artifacts. If this is of concern, a two-dimensional median filter can be substituted. In this instance, too, the form of the filter can be considerably simplified by following the principles set forth for the one-dimensional filter described. Again, the spatial extent is significant, and it is advantageous to provide an increase in the spatial extent, while omitting closer pixels to simplify the number of terms.

Referring now to FIG. 4, there is depicted a seven by five rectangular array 70 of thirty-five pixels of which the nine values which are to be used in the two-dimensional median filter of the invention are denoted by P's. The pixel 71 whose value is to be replaced with the median value of the nine pixels is shown at the center of the array. As seen, the eight other pixels include the two on the same horizontal line three pixels away on either side, two on the same vertical line, two pixels away on either side, and four pixels on adjacent lines, each two pixels away on the horizontal and one pixel away on the vertical. It will be well understood that the invention is not limited to the specific spacing arrangement described for the pixels used in the median filter operation and that other specific arrangements are well within the scope of the invention.

In this situation, the sorting of the median value is done in a well-known manner typically either by a special purpose microprocessor or a digital signal processor appropriately programmed.

While the invention has been described for apparatus which uses three ranges of wavelength, or primary colors, for the imaging and reproduction, the principles should be applicable to apparatus which uses more than three colors.

Moreover, while the invention has been described primarily with reference to processing analog signals, it should also be amenable to use of digital signals if the analog signals derived are first converted to digital for processing and reconverted to analog for reproduction of the image scene.

Other embodiments of the invention including additions, subtractions, deletions and other modifications of the preferred disclosed embodiment of the invention will be obvious to those skilled in the art and are within the scope of the following claims.

What is claimed is:

1. An electronic imaging apparatus comprising:
   an image sensing array comprising a predetermined number of discrete image sensing elements each responsive to incident illumination from a subject to provide an electronic information signal corresponding to the intensity of the illumination incident thereto;
   means for filtering the illumination incident to said image sensing array so that at least a first group of said image sensing elements receives illumination within a first select range of wavelengths, a second select group of said image sensing elements receives illumination within a second select range of wavelengths different from said first select range, and a third select group of said image sensing elements receives illumination within a third select range of wavelengths different from said first and second select ranges;

means for interpolating the electronic information signals from said first group of image sensing elements for providing a first set of electronic information signals corresponding to the intensity of illumination within said first range of wavelengths for said first, second, and third groups of image sensing elements, for interpolating the electronic information signals from said second group of image sensing elements for providing a second set of electronic information signals corresponding to the intensity of illumination within said second range of wavelengths for said first, second and third groups of image sensing elements, and for interpolating the electronic information signals from said third group of image sensing elements for providing a third set of electronic information signals corresponding to the intensity of illumination within said third range of wavelengths for said first, second, and third groups of image sensing elements, means for combining said first and second sets of electronic information signals to provide a first combined electronic information signal and median filtering said first combined electronic information signal to provide a first processed electronic information signal and for combining said second and third sets of electronic information signals to provide a second combined electronic information signal and median filtering said second combined electronic information signal to provide a second processed electronic information signal; and means for combining said first and second processed electronic information signals for each image sensing element in said first group of image sensing elements with the electronic information signal originally sensed for that same image sensing element in said first group to provide first output electronic information signals corresponding, respectively, to the intensity of incident illumination within both said second and third range of wavelengths for each of said first group of image sensing elements, combining said first and second processed electronic information signals for each image sensing element in said second group of image sensing elements with the electronic information signal originally sensed for that same image sensing element in said second group to provide second output electronic information signals corresponding, respectively, to the intensity of incident illumination with both said first and third ranges of wavelengths, and for combining said first and second processed electronic information signals for each image sensing element in said third group of image sensing elements with the electronic information signal originally sensed for that same image sensing element in said third group to provide third output electronic information signals corresponding, respectively, to the intensity of incident illumination within both said first and second ranges of wavelengths for each of said third group of image sensing elements.

2. The apparatus of claim 1 including a first gate circuit connected to receive electronic information signals originally sensed by said first group of image sensing elements as well as said first output electronic information signals corresponding, respectively, to the intensity of incident illumination within said second and third range of wavelengths for each of said first group of image sensing elements, a second gate circuit connected to receive electronic information signals originally sensed by said second group of image sensing elements as well as said second output electronic information signals corresponding, respectively, to the intensity of incident illumination within said first and third ranges of wavelengths for each of said second group of image sensing elements, and a third gate circuit connected to receive electronic information signals originally sensed by said third group of image sensing elements as well as said third output electronic information signals corresponding, respectively, to the intensity of incident illumination within said first and second ranges of wavelengths for each of said third group of image sensing elements, said gate circuits each being selectively enableable to transmit therethrough each of the signals received thereby; and timing control means for providing a timing control signal to selectively enable said gate circuits, one at a time, in correspondence with the receipt by that one of said gate circuits to be enabled of its originally sensed electronic information signal.

3. The apparatus of claim 2 wherein said means for combining said first and second processed information signals comprises a plurality of adders and subtractors, a first subtractor of which is connected to provide an output signal corresponding to the difference between said first and second processed electronic information signals.

4. The apparatus of claim 3 wherein said adders and subtractors of said combining means further comprise a first adder for providing one of the signals received by said first gate circuit corresponding to the sum of said first processed electronic information signal and the electronic information signal originally sensed by said first group of image sensing elements, a second adder for providing another of the signals received by said first gate circuit corresponding to the sum of said second processed electronic information signal and the electronic information signal originally sensed by said first group of image sensing elements, a third adder for providing one of the signals received by said second gate circuit corresponding to the sum of said output signal from said first subtractor and the electronic information signal originally sensed by said second group of image sensing elements, a second subtractor for providing another one of the signals received by said second gate circuit corresponding to the different between said second processed electronic information signal and the electronic information signal originally sensed by said second group of image sensing elements, a third subtractor for providing one of the signals received by said third gate circuit corresponding to the different between said first processed electronic information signal and the electronic information signal originally sensed by said third group of image sensing elements, and a fourth subtractor for providing another one of the signals received by said third gate circuit corresponding to the difference between said output signal from said first subtractor and the electronic information signal originally sensed by said third group of image sensing elements.

5. The apparatus of claim 1 wherein said means for median filtering comprises means for selecting the median combined electronic information signal for each image sensing element from a select plurality of combined electronic information signals each corresponding, respectively, to one of a plurality of select image sensing elements, said select image sensing elements being spaced apart with respect to each other by other non-select image sensing elements.

6. The apparatus of claim 5 wherein said select image sensing elements are linearly arranged with respect to each other and comprise first, fourth and seventh image sensing elements in a line of seven consecutively spaced image sensing elements.

7. The apparatus of claim 5 wherein said select image sensing elements are part of a two-dimensional array comprising five rows of seven image sensing elements in each row wherein said select image sensing elements comprise the fourth image sensing element of said first and fifth rows, the second and sixth image sensing elements of said second and fourth rows, respectively, and the first, fourth and seventh image sensing elements of said third row.

8. The apparatus of claim 1 including means for low pass filtering said first and second combined electronic information signals prior to median filtering and immediately subsequent to median filtering.

9. In an electronic imaging apparatus of the type comprising an image sensing array including a predetermined number of discrete image sensing elements each responsive to incident illumination from a subject to provide an electronic information signal corresponding to the intensity of the illumination incident thereto; means for filtering the illumination incident to said image sensing array so that at least a first group of said image sensing elements receives illumination within a first select range of wavelengths and a second select group of said image sensing elements receives illumination within a second select range of wavelengths different from said first select range; means for interpolating the electronic information signals from said first group of image sensing elements for providing a first set of electronic information signals corresponding to the intensity of illumination within said first range of wavelengths for said first and second groups and for interpolating the electronic information signals from said second group of image sensing elements for providing a second set of electronic information signals corresponding to the intensity of illumination within said second range of wavelengths for said first and second groups of image sensing elements, means for combining said first and second sets of electronic information signals to provide a combined electronic information signal and thereafter median filtering said combined electronic information signal to provide a processed electronic information signal for each image sensing element, and means for combining the processed electronic information signal for each image sensing element in said first group of image sensing elements with the electronic information originally sensed for that same image sensing element in said first group to provide an output electronic information signal corresponding to the intensity of incident illumination within said second range of wavelengths for each of said first group of image sensing elements, and for combining said processed electronic information signal for each image sensing element in said second group of image sensing elements with the electronic information signal originally sensed for that same image sensing element in said second group to provide another output electronic information signal corresponding to the intensity of incident illumination within said first range of wavelengths for each of said second group of image sensing elements, the improvement characterized by:

said means for median filtering including means for selecting the median combined electronic information signal for each image sensing element from a select plurality of combined electronic information signals each corresponding, respectively, to one of a plurality of select image sensing elements, said select image sensing elements being spaced apart with respect to each other by other non-select image sensing elements.

10. The apparatus of claim 9 wherein said select image sensing elements are linearly arranged with respect to each other and comprise first, fourth and seventh image sensing elements in a line of seven consecutively spaced image sensing elements.

11. The apparatus of claim 9 wherein said select image sensing elements are part of a two-dimensional array comprising five rows of seven image sensing elements in each row wherein said select image sensing elements comprise the fourth image sensing element of said first and fifth rows, the second and sixth image sensing elements of said second and fourth rows, respectively, and the first, fourth, and seventh image sensing elements of said third row.

12. A method of sensing a subject and providing an output from which a visible image of the subject may be constructed comprising the steps of:

sensing light from the subject with an image sensing array comprising a predetermined number of discrete image sensing elements each of which responds to incident illumination from the subject to provide an output corresponding to the intensity of the illumination incident thereto;

filtering the illumination incident to the image sensing array so that at least a first group of image sensing elements receives illumination within a first select range of wavelengths, a second group of image sensing elements receives illumination within a second select range of wavelengths and a third group of image sensing elements receives illumination within a third select range of wavelengths;

interpolating the outputs from the first group of image sensing elements to provide a first set of outputs corresponding to the intensity of illumination within the first range of wavelengths for said first, second, and third groups of image sensing elements;

interpolating the outputs from the second group of image sensing elements to provide a second set of outputs corresponding to the intensity of illumination within the second range of wavelengths for said first, second, and third groups of image sensing elements;

interpolating the outputs from the third group of image sensing elements to provide a third set of outputs corresponding to the intensity of illumination within the third range of wavelengths for said first, second, and third groups of image sensing elements;

combining said first and second sets of outputs to provide a first combined output;

median filtering said first combined output to provide a first processed output corresponding to the median value of said first combined output;

combining said second and third sets of outputs to provide a second combined output;

median filtering said second combined output to provide a second processed output corresponding to the median value of said second combined output;

combining said first and second processed outputs for each image sensing element in said first group of image sensing elements with the output originally sensed for that same image sensing element in said first group to provide first output electronic information signals corresponding, respectively, to the intensity of illumination within both said second and third ranges of wavelengths for each of said first groups of image sensing elements;

combining said first and second processed outputs for each image sensing element in said second group of image sensing elements with the output originally sensed for that same image sensing element in said second group to provide second output electronic information signals corresponding, respectively, to the intensity of illumination within both said first and third ranges of wavelengths; and combining said first and second processed outputs for each image sensing element in said third group of image sensing elements with the output originally sensed for that same image sensing element in said third group to provide third output electronic information signals corresponding, respectively, to the intensity of illumination within both said first and second ranges of wavelengths.

13. The method of claim 12 further comprising the steps of:

gating through the output originally sensed by said first group of image sensing elements and said first output electronic information signals in correspondence with receipt of the output originally sensed by said first group of image sensing elements;

gating through the output originally sensed by said second group of image sensing elements and said second output electronic information signal in correspondence with receipt of the output originally sensed by said second group of image sensing elements; and gating through the output originally sensed by said third group of image sensing elements and said third output electronic information signal in correspondence with receipt of the output originally sensed by said third group of image sensing elements.

14. The method of claim 13 wherein said step of combining said first and second processed outputs with the output originally sensed for that same image sensing element in said first group comprises the steps of: adding said first processed output and the output originally sensed by said first group of image sensing elements to provide said first output electronic information signal corresponding to the intensity of illumination within said second range of wavelengths; adding said second processed output and the output originally sensed for said first group of image sensing elements to provide said first output electronic information signal corresponding to the intensity of illumination within said third range of wavelengths; providing a difference output corresponding to the difference between said first and second processed outputs; adding said difference output and the output originally sensed by second group of image sensing elements to provide said second output electronic information signal corresponding to the intensity of illumination within said first range of wavelengths; taking the difference between said second processed output and the output originally sensed by said second group of image sensing elements to provide said second output electronic information signal corresponding to the intensity of illumination within said third range of wavelengths, taking the difference between said first processed output and the output originally sensed by said third group of image sensing elements to provide said third output electronic information signal corresponding to the intensity of illumination within said first range of wavelengths; and taking tne difference between said difference output and the output originally sensed by said third group of image sensing elements to provide said third output electronic information signal corresponding to the intensity of illumination within said second range of wavelengths.

15. The method of claim 12 wherein each of said steps for median filtering comprises determining the median value for each image sensing element from a select plurality of combined outputs each corresponding, respectively, to one of a plurality of select image sensing elements and selecting said select image sensing elements to be spaced apart with respect to each other by non-select image sensing elements.

16. The method of claim 15 wherein said step of selecting said select image sensing element comprises selecting first, fourth and seventh image sensing elements from a line of seven consecutively spaced image sensing elements.

17. The method of claim 15 wherein said step of selecting said select image sensing element comprises first designating a two-dimensional array having five rows with seven image sensing elements in each row and thereafter selecting the fourth image sensing element of said first and fifth rows, the second and sixth image sensing elements of said second and fourth rows, respectively, and the first, fourth and seventh image sensing elements of said third row.

18. The method of claim 1 including the step of low pass filtering said first and second combined outputs prior to median filtering and immediately subsequent to median filtering.

19. A method of sensing a subject and providing an output from which a visible image of the subject may be constructed comprising the steps of:

sensing light from the subject with an image sensing array comprising a predetermined number of discrete image sensing elements each of which responds to incident illumination from the subject to provide an output corresponding to the intensity of the illumination incident thereto;

filtering the illumination incident to the image sensing array so that at least a first group of said image sensing elements receives illumination within a first select range of wavelengths and a second select group of image sensing elements receives illumination within a second select range of wavelengths different from said first select range;

interpolating the output from said first group of image sensing elements for providing a first set of outputs corresponding to the intensity of illumination within the first range of wavelengths for said first and second groups of image sensing elements;

interpolating the output from said second group of image sensing elements for providing a second set of outputs corresponding to the intensity of illumination within the second range of wavelengths for said first and second groups of image sensing elements;

combining said first and second sets of outputs to provide a first combined output;

median filtering said first combined output by determining the median value for each image sensing element from a select plurality of combined outputs each corresponding, respectively, to one of a plurality of select image sensing elements and selecting said select image sensing elements to be spaced apart with respect to each other by non-select image sensing elements;

combining the median filtered output for each image sensing element in said first group of image sensing elements with the output originally sensed for that same image sensing element in said first group to provide a first output electronic information signal corresponding, respectively, to the intensity of illumination within said second range of wavelengths for each of said first group of image sensing elements; and combining the median filtered output for each image sensing element in said second group of image sensing elements with the output originally sensed for that same image sensing element in said second group to provide a second output electronic information signal corresponding, respectively, to the intensity of illumination within said first range of wavelengths for each of said second groups of image sensing elements.

20. The method of claim 19 wherein said step of selecting said select image sensing elements comprises selecting first, fourth and seventh image sensing elements from a line of seven consecutively spaced image sensing elements.

21. The method of claim 19 wherein said step of selecting said select image sensing elements comprises first designating a two-dimensional array having five rows with seven image sensing elements in each row and thereafter selecting the fourth image sensing element of said first and fifth rows, the second and sixth image sensing elements of said second and fourth rows, respectively, and the first, fourth and seventh image sensing elements of said third row.

* * * * *